E. J. HARDY.
UNIVERSAL JOINT.
APPLICATION FILED JULY 17, 1917.
1,290,551.
Patented Jan. 7, 1919.
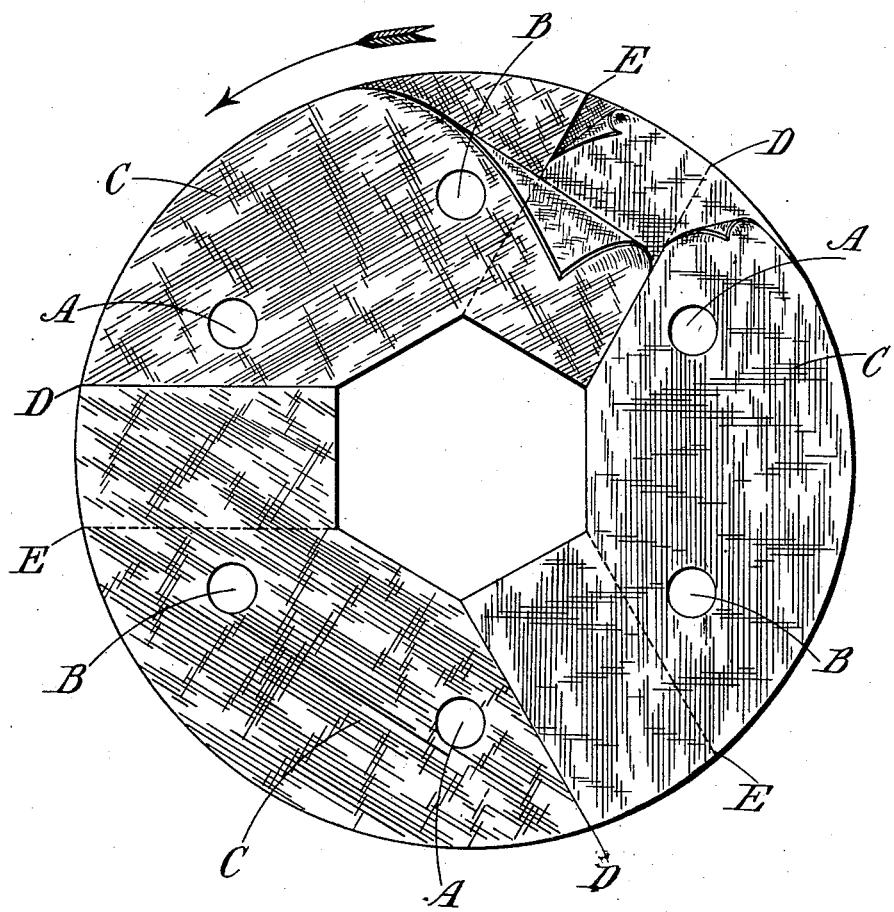
Inventor
Edward John Hardy

UNITED STATES PATENT OFFICE.

EDWARD JOHN HARDY, OF WARWICKSHIRE, ENGLAND.

UNIVERSAL JOINT.

1,290,551.      Specification of Letters Patent.      Patented Jan. 7, 1919.

Application filed July 17, 1917. Serial No. 180,965.

*To all whom it may concern:*

Be it known that I, EDWARD JOHN HARDY, a subject of the king of England, residing in Warwickshire, England, have invented a certain new and Improved Universal Joint, of which the following is a specification.

This invention relates to improvements in flexible universal joints of the kind in which a driven shaft element and a driving shaft element are provided at their adjacent ends with jaws or studs arranged so that the driving studs and the driven studs are alternately disposed in one plane; a disk or ring composed of adhering layers of textile fabric provided with suitable holes, being slipped on to the studs to transmit the drive. According to this invention each layer of textile fabric is formed in similarly shaped segments each of which segments transmits the driving pull from a driving stud to its adjacent driven stud, and all the segments are cut from the fabric so that the threads are parallel to a line joining the said studs, and the joints of segments in adjacent layers are staggered.

Such a construction is intended mainly for use in transmitting a drive in one direction only, (such as at the universal joint between the clutch and gear box in a motor vehicle where no reversal takes place) for the reason that the joints of the segments will not bear such an excessive stress as the continuous fabric of the segments.

The invention is illustrated in the accompanying drawing which shows a ring suitable for a three point universal joint. The holes A can receive the three studs of the driving element, and the holes B can receive the three studs of the driven element. The direction of rotation is indicated by the arrow. Each of the three segments C forming a layer, are similarly shaped in all the layers, which simplifies their manufacture. They are cut from the fabric so that the threads run parallel to a line joining the holes A and B in each segment, so that there is always a straight pull on the threads of the material. Any number of layers may be used in the manufacture of a ring, and they are secured together by vulcanization or any other suitable means.

It will be seen that the joints in the segments are not subjected to transmission stresses when the direction of rotation is that shown by the arrow. The lines D and E indicate staggered joints of the segments throughout the thickness of the ring.

It will be observed that each section has an extension at one end which overlaps a similar extension on the section of an adjacent layer. In other words the sections of adjacent layers are reversed in that the extensions of the sections of one layer point in one direction, and the extensions of the sections of the adjacent layer, or layers, point in the opposite direction. By this a staggered relation of the joints is secured in respect to adjacent layers.

What I claim as my invention and desire to secure by Letters Patent is:—

A universal joint comprising a series of layers of textile fabric united with each other, and having openings to receive driving and driven studs, each layer of textile fabric being formed in sections, each section receiving a driving stud and a driven stud, and having its threads running substantially parallel to a line joining the studs, each section having an extension to overlie an extension of a section of the next layer, the sections in one layer being in reverse position in respect to the sections in adjacent layers, thereby making their extensions project in opposite directions to stagger the joints in adjacent layers, substantially as described.

In testimony whereof I have signed my name to this specification in the presence of two subscribing witnesses.

EDWARD JOHN HARDY.

Witnesses:
ERNEST HARKER,
DAVID C. KERR.